(12) United States Patent
Yancey et al.

(10) Patent No.: US 11,718,561 B2
(45) Date of Patent: Aug. 8, 2023

(54) COMPOSITION AND STRUCTURES CREATED THEREWITH

(71) Applicant: Perma Edge Industries, LLC, Beavercreek, OH (US)

(72) Inventors: Christopher K. Yancey, Beavercreek, OH (US); Scott P. Doyle, Beavercreek, OH (US)

(*) Notice: Subject to any disclaimer, the term of this patent is extended or adjusted under 35 U.S.C. 154(b) by 459 days.

(21) Appl. No.: 16/176,723

(22) Filed: Oct. 31, 2018

(65) Prior Publication Data
US 2019/0127279 A1 May 2, 2019

Related U.S. Application Data

(60) Provisional application No. 62/579,758, filed on Oct. 31, 2017.

(51) Int. Cl.
*C04B 28/04* (2006.01)
*C04B 14/06* (2006.01)
(Continued)

(52) U.S. Cl.
CPC .............. *C04B 28/04* (2013.01); *C04B 14/06* (2013.01); *C04B 16/06* (2013.01); *C04B 18/146* (2013.01);
(Continued)

(58) Field of Classification Search
CPC ....... C04B 14/06; C04B 18/146; C04B 28/04; C04B 16/0625; C04B 16/0633;
(Continued)

(56) References Cited

U.S. PATENT DOCUMENTS 4,168,984 A * 9/1979 Ray ................. C04B 24/045
106/696
5,571,319 A * 11/1996 Berke ................. C04B 28/02
106/802
(Continued)

FOREIGN PATENT DOCUMENTS

CN 101200361 A 6/2008
CN 102010160 A 4/2011
(Continued)

OTHER PUBLICATIONS

Prasanya D. et al.; "Effects of Fiber and Silica Fume Characteristics on Mechanical Properties of High-Strength Concrete"; International Research Journal of Engineering and Technology (IRJET); vol. 3, Issue 5; May 2016.
(Continued)

*Primary Examiner* — Shuangyi Abu Ali
(74) *Attorney, Agent, or Firm* — Thomas E. Lees, LLC

(57) ABSTRACT

According to aspects of the present disclosure, a composition is disclosed, which can be utilized to construct a retention structure, e.g., for use with hardscape such as pavers, tile, stone, and other building materials. The composition is a mixture of a cement component (e.g., Portland cement), a sand component, a gravel component, a silica fume component, and fiber component, the above-components mixed in varying ratios. When the cement component, sand component, gravel component, silica fume component, and fiber component are mixed in an effective amount, combined with a water component, and applied against a hardscape, the composition, once cured, defines a retention structure that abuts to, but is not adhered to the hardscape.

17 Claims, 8 Drawing Sheets

(51) Int. Cl.
*C04B 16/06* (2006.01)
*C04B 18/14* (2006.01)
*C04B 111/00* (2006.01)
*C04B 103/65* (2006.01)
*C04B 111/27* (2006.01)

(52) U.S. Cl.
CPC . *C04B 2103/65* (2013.01); *C04B 2111/00293* (2013.01); *C04B 2111/00301* (2013.01); *C04B 2111/27* (2013.01)

(58) Field of Classification Search
CPC ... C04B 16/065; C04B 16/0683; C04B 16/06; C04B 2103/65; C04B 2111/00293; C04B 2111/00301; C04B 2111/27; Y02W 30/91
See application file for complete search history.

(56) References Cited

U.S. PATENT DOCUMENTS

| | | | | |
|---|---|---|---|---|
| 2004/0065233 | A1* | 4/2004 | Cook | C04B 28/02 106/805 |
| 2015/0321957 | A1* | 11/2015 | Dannhorn | C04B 24/16 106/805 |

| | | | |
|---|---|---|---|
| 2018/0141867 | A1 | 5/2018 | Zampini et al. |
| 2018/0230056 | A1 | 8/2018 | Chiaverini et al. |

FOREIGN PATENT DOCUMENTS

| | | |
|---|---|---|
| CN | 104446239 A | 3/2015 |
| FR | 2633922 A1 | 1/1990 |
| FR | 2941451 B1 | 11/2011 |
| KR | 101187320 B1 | 9/2012 |

OTHER PUBLICATIONS

Zhang, P. et al.; "Combined effect of silica fume and polypropylene fiber on drying shrinkage properties of concrete composites containing fly ash"; Sharif University of Technology; Scientia Iranica; vol. 20, Issue 5; Aug. 13, 2013.

Nili, M. et al.; "The effects of silica fume and polypropylene fibers on the impact resistance and mechanical properties of concrete"; Construction and Building Materials; vol. 24; 2010.

* cited by examiner

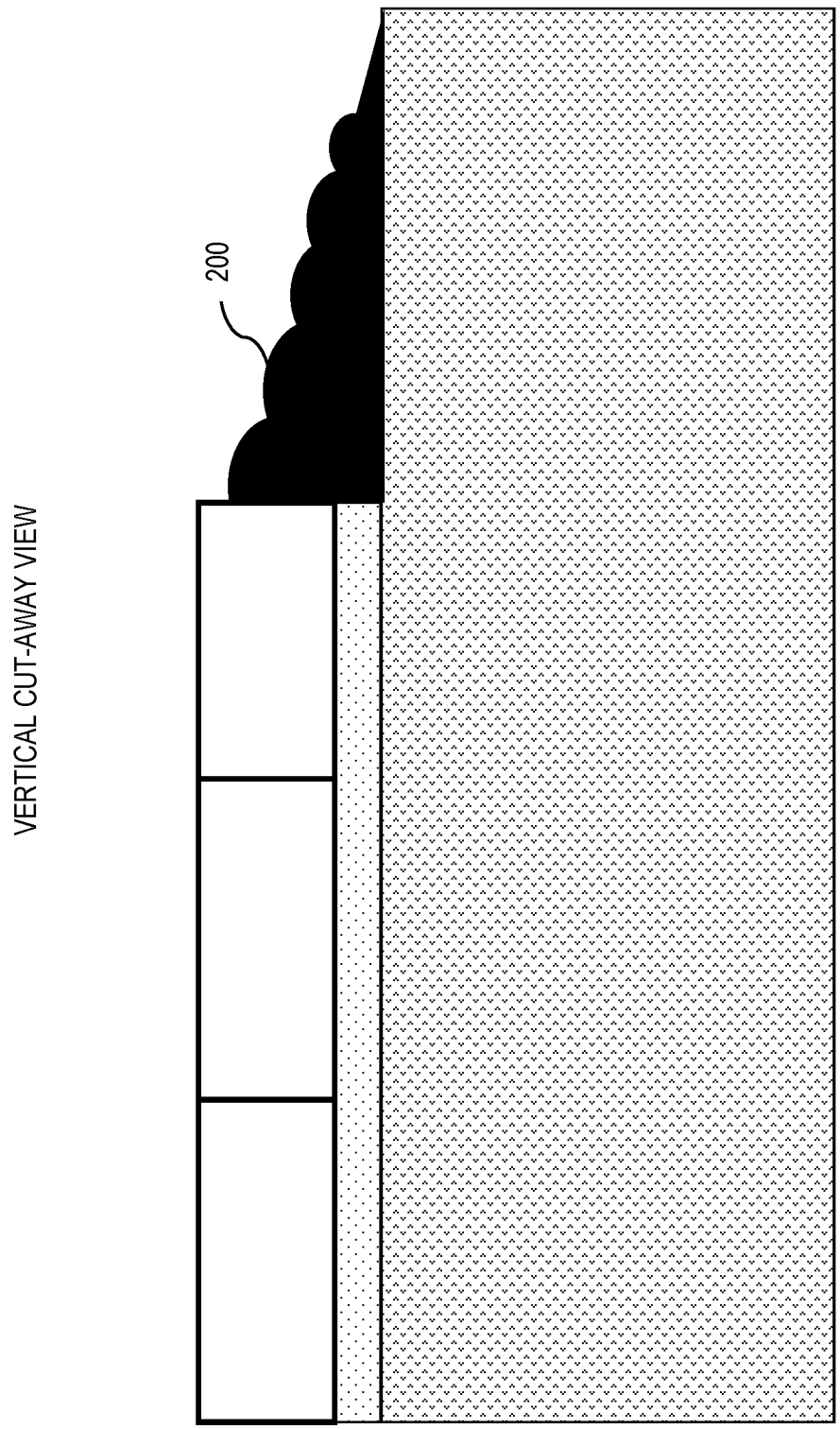

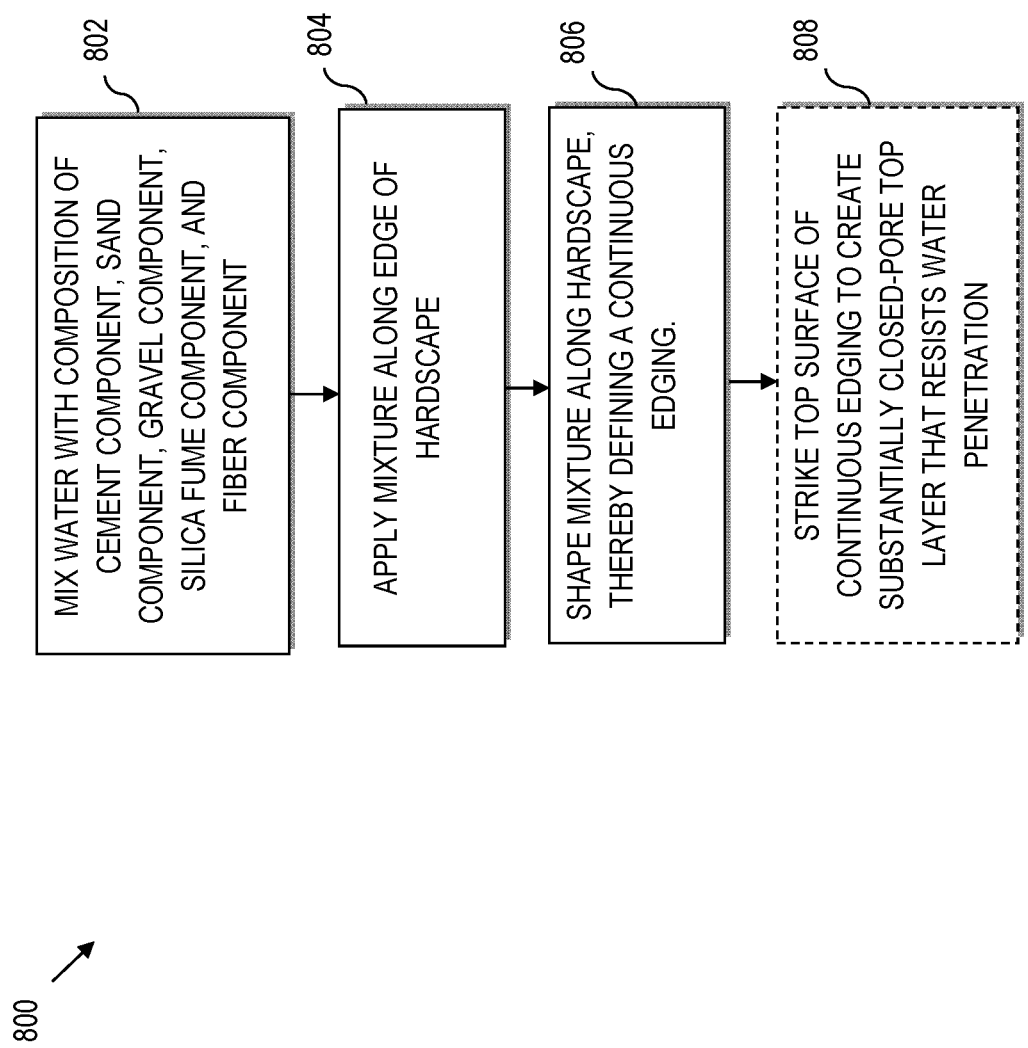

COMPOSITION AND STRUCTURES CREATED THEREWITH

CROSS REFERENCE TO RELATED APPLICATIONS

This application claims the benefit of U.S. Provisional Patent Application Ser. No. 62/579,758, filed Oct. 31, 2017, entitled "COMPOSITION AND STRUCTURES CREATED THERWITH", the disclosure of which is hereby incorporated by reference.

BACKGROUND

Various aspects of the present disclosure relate generally to compositions suitable for use in creating retention structures. Aspects also relate to structures, including retention structures, created using a composition described herein.

Many outdoor structures (e.g., hardscape such as paver patios, walkways, and other features) are subject to inclement weather, variable weather, and other natural influences. One such natural influence is a fluctuation of the ground, including ground shifting (e.g., heave), changes in ground level surface (e.g., due to erosion), etc., which can displace or disturb the various outdoor structures.

BRIEF SUMMARY

According to aspects of the present disclosure, a composition is disclosed, which can be utilized to construct a retention structure, e.g., for use with hardscape such as pavers, tile, stone, and other building materials. The composition is a mixture of a cement component (e.g., Portland cement), a sand component, a gravel component, a silica fume component, and fiber component, the above-components mixed in varying ratios. When the cement component, sand component, gravel component, silica fume component, and fiber component are mixed in an effective amount, combined with a water component, and applied against a hardscape, the composition, once cured, defines a retention structure that abuts to, but is not adhered to the hardscape.

According to further aspects of the present disclosure, a hardscape retention structure created by a process is disclosed. The process includes mixing water with a composition of a cement component, a sand component, a gravel component, a silica fume component, and a fiber component to define a mixture. The process also includes applying the mixture along an edge of a hardscape. In addition, the process involves shaping the mixture along the hardscape. When the cement component, sand component, gravel component, silica fume component, and fiber component are mixed in an effective amount and mixed with the water component, such that the mixture, once cured, results in a hardscape retention structure that abuts to, but is not adhered to the hardscape.

According to yet further aspects of the present disclosure, a process for creating a continuous edging for hardscape is disclosed. The process includes mixing water with a composition of a cement component, a sand component, a gravel component, a silica fume component, and a fiber component to define a mixture. The process also includes applying the mixture along an edge of a hardscape. In addition, the process involves shaping the mixture along the hardscape. When the cement component, sand component, gravel component, silica fume component, and fiber component are mixed in an effective amount and mixed with the water component, such that the mixture, once cured, results in a continuous edging that abuts to, but is not adhered to the hardscape.

BRIEF DESCRIPTION OF THE SEVERAL VIEWS OF THE DRAWINGS

FIG. 7 is a vertical cut-away view of yet another example embodiment of a retention structure for landscape articles comprised of a composition disclosed herein according to aspects of the present disclosure; and FIG. 8 is a flow chart for a process of creating a continuous edging for hardscape according to aspects of the present disclosure.

DETAILED DESCRIPTION

Introduction

Ground level outdoor structures such as patios constructed using pavers, flagstones, and other interlocking stone systems (i.e., hardscapes) may be subject to many different adverse conditions. For example, inclement weather and temperature cycling can cause the underlying base to shift, settle, heave, combinations thereof, etc., over time, which can have an adverse effect on the aesthetics and/or integrity of the hardscape, and can even cause damage to adjacent structures. For instance, in the case of ground pavers, sustained exposure to inclement weather and/or ground fluctuations may result in tipping or separation of the ground pavers from one another.

In an attempt to mitigate effects of adverse conditions, including those listed above, solutions such as retention structures are used to retain hardscapes. However, such retention structure solutions are themselves subject to failure due to the ground shifting, settling heaving, etc., over time as described in greater detail below.

The composition(s) and retention structure(s) herein are specifically designed and engineered to be a restraint (e.g., edging) for any hardscapes such as pavement system (e.g., pavers, flagstone, etc.) by creating a strong, durable, long lasting edge.

The combined components that form the composition, as described more fully herein, provide an edging solution that is more flexible and water resistant than concrete, mortar, etcetera. Still further, a mixture formed by combining water and a composition described herein can be spread, poured, shaped, or otherwise applied in a thin profile, hand troweled into place, etc., and will not deteriorate like concrete or mortar.

Plastic Retention

Figure 1:
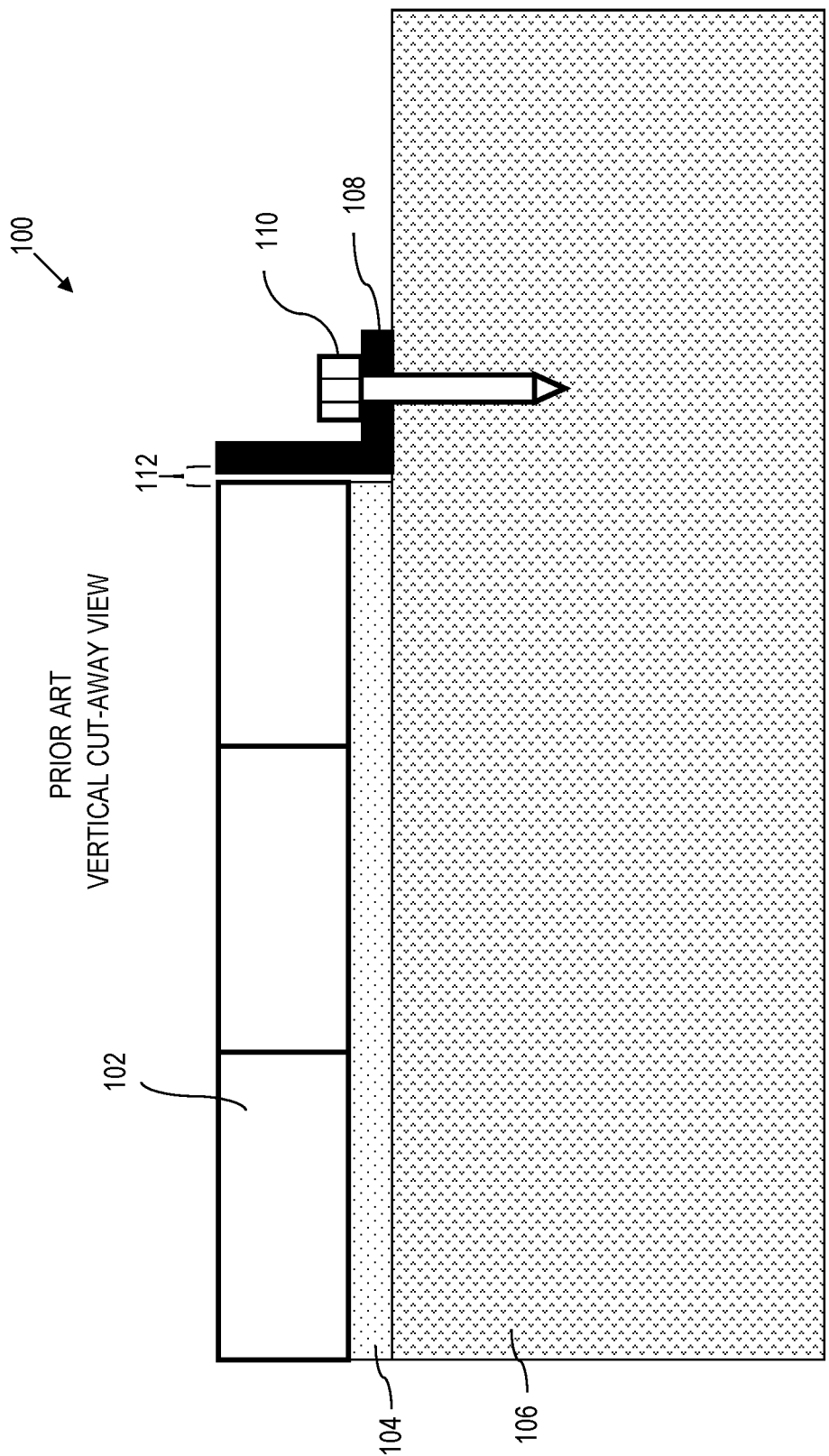
FIG. 1 is a vertical cut-away view of a retention structure for landscape articles as known in the prior art.

Now referring to the figures, FIG. 1 is an illustrative example of a previous retention structure solution 100 for pavers made out of a plastic material. In this example, pavers 102 are placed on a sub-base (e.g., a bed of sand) 104, both of which rest on a ground surface 106 such as dirt. In order to retain the pavers 102 and sub-base 104, a liner 108 is placed along the pavers 102 and sub-base 104. The liner 108 can be made from a variety of materials, but is typically plastic. Once the liner 108 is in place, a spike 110 or similar implement is punched through the liner 108 into the ground surface 106.

Ideally, the liner 108 and the spike 110 hold tightly against the pavers 102 to prevent the pavers 102 from shifting or breaking over time. However, one common issue with the retention structure solution 100 is that over time, natural fluctuations of the ground surface 106 can cause the spike 110 to work its way out of the ground surface 106 (i.e., "heave") and separate from the liner 108, thus compromising the retention structure 100.

Further, foreign material (e.g., dirt) may enter a spatial gap 112 located between the liner 108 and the paver 102/sub-base 104, which allows water, snow, and other moisture to access the sub-base 104 and break down the sub-base 104 over time from multiple freeze and thaw cycles during seasonal changes. Also, debris, grass, or mulch, can lodge in the spatial gap 112 creating an undesirable edge. Moreover, the liner 108 is a material that is easily deformed, damaged, etc., through normal use and enjoyment of the corresponding hardscape.

Figure 2:
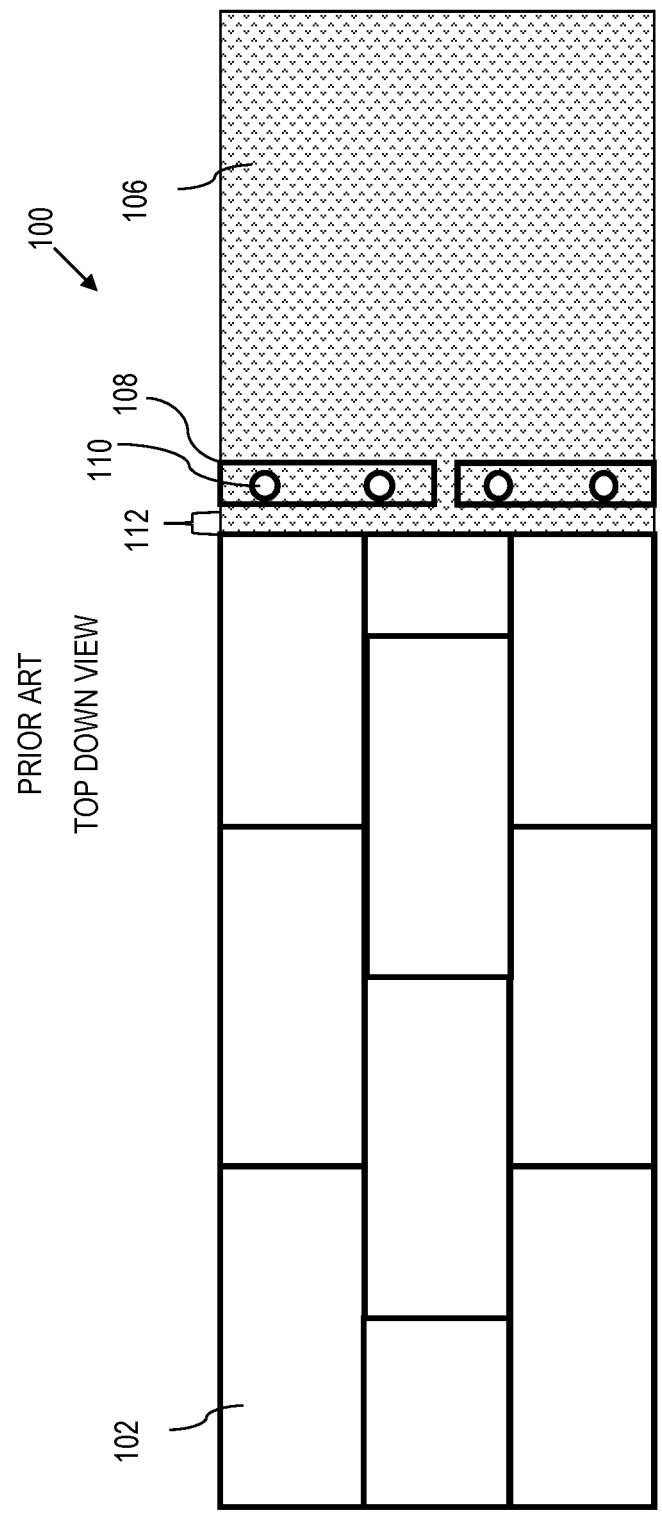
FIG. 2 is a top down view of the retention structure for the landscape articles as illustrated in FIG. 1.

FIG. 2 is a top down view of the previous retention structure solution 100 illustrated in FIG. 1, which further illustrates the spatial gap 112 between the liner 108 and the paver 102. Moreover, certain implementations of previous retention structure solution 100 separate the liner 108 into multiple sections, which may further compromise the structural integrity of previous retention structure solution 100. As a result, field repair may become necessary over time.

Accordingly, aspects of the present disclosure are directed toward a composition that, when implemented as a retention structure, overcomes the issues presented above.

Composition Examples

According to aspects of the present disclosure, a composition example is disclosed. The composition in comprises a cement component, a sand component, a gravel component, a silica fume component, and a fiber component. When the cement component, sand component, gravel component, silica fume component, and fiber component are mixed in an effective amount, combined with a water component, and applied against a hardscape, the composition, once cured, defines a retention structure that abuts to, but is not adhered to the hardscape.

As described herein, the composition may be a concrete-type composition. For this disclosure, cement and concrete are not used interchangeable. Generally, concrete is a mixture of aggregates and a paste. Aggregates include sand, gravel, silica fume, fiber, etcetera. The paste includes cement and water. As described in greater detail herein, although concrete is comprised of aggregates and a paste, the composition, once cured, defines a retention structure that abuts to, but surprisingly is not adhered to the hardscape itself.

The cement component typically has a weight between about 10% and about 25% by weight of the composition. In other embodiments, the cement component has a weight between about 14% and about 19% by weight of the composition. In alternate embodiments, the cement component has a weight between about 16% and about 17% by weight of the composition. One non-limiting example of a suitable cement component is Portland cement.

Further, the sand component typically has a weight between about 30% and about 50% by weight of the composition. In other embodiments, the sand component has a weight between about 35% and about 45% by weight of the composition. In alternate embodiments, the sand component has a weight between about 38% and about 41% by weight of the composition. One non-limiting example of a suitable sand component is silica sand.

Yet further, the gravel component typically has a weight between about 35% and about 55% by weight of the composition. In select embodiments, the gravel component has a weight between about 40% and about 50% by weight of the composition. Alternatively, in other embodiments, the gravel component has a weight between about 42% and about 46% by weight of the composition.

Additionally, the silica fume component typically has a weight between about 0.20% and about 1.40% by weight of the composition. In various embodiments, the silica fume component has a weight between about 0.40% and about 1.20% by weight of the composition. In other embodiments, the silica fume component has a weight between about 0.60% and about 1.00% by weight of the composition. For this disclosure, silica fume (or equivalent component) is a siliceous material such that when combined with a cement or a concrete, improves various physical properties of the cement or concrete, such as overall strength, bond strength, or resistance to water.

Moreover, the fiber component typically has a weight between about 0.005% and about 0.025% by weight of the composition. In various embodiments, the fiber component has a weight between about 0.0100% and about 0.0200% by weight of the composition. In alternate embodiments, the fiber component has a weight between about 0.0125% and about 0.0175% by weight of the composition. the fiber component is comprised of fibers that are heterogeneous in length.

Examples of the fiber component include thermoplastic polymers, polypropylene, polyethylene, polyester, nylon, acrylic, macro-fibers, micro-fibers, sika fibers, fiber blends, and other synthetic fibers. Under certain implementations, the fiber may also improve various physical aspects of cement or concrete.

As described in greater detail herein, varying amounts of the silica fume component and the fiber component may be used to increase strength, flexibility, and durability of the component and resulting retention structure.

Accordingly, when the cement component, sand component, gravel component, silica fume component, and fiber component are mixed in an effective amount, combined with a water component, and applied against a hardscape, the composition, once cured, defines a retention structure that abuts to, but is not adhered to the hardscape. In various embodiments, the water is between about 8% and about 12% of a total weight of the composition.

In use, a worker mixes the composition with water (8%-12%) until the composition is workable, then spreads the composition into a desired shape and location, (e.g., along the edges of a paver patio or other structure). The worker can use a tool such as a shovel to dispense the mixture from a mixing station, and a trowel to shape the mixed composition into a desired shape (e.g., a wedge).

Effective Amount Examples

A first example of a composition utilizing effective amounts of cement, sand, gravel, silica fume, and fiber is illustrated in table 1 below.

TABLE 1

| No. | Ingredient | Weight (lbs.) |
|---|---|---|
| 1 | Cement | 26.6 |
| 2 | Sand | 53.7 |
| 3 | Gravel | 59.2 |
| 4 | Silica Fume | 1.13 |
| 5 | Fiber | 0.02 |

For further illustration, a second example of a composition utilizing effective amounts of cement, sand, gravel, silica fume, and fiber is illustrated in table 2 below.

TABLE 2

| No. | Ingredient | Weight (%) |
|---|---|---|
| 1 | Cement | 16.0 |
| 2 | Sand | 40.0 |
| 3 | Gravel | 43.0 |
| 4 | Silica Fume | 1.00 |
| 5 | Fiber | 0.01 |

Table 1 and Table 2 are merely illustrative examples of effective amounts and are by no means limiting. The following are example ranges for each component that yield effective amounts for the composition(s). As disclosed above, the cement component can range from about 10%-25% by weight, the sand component has a weight between about 30% and about 50% by weight, the gravel component has a weight between about 35% and about 55% by weight, the silica fume component has a weight between about 0.20% and about 1.40% by weight, and the fiber component having a weight between about 0.005% and about 0.025% by weight of the composition.

When the above components (in their respective effective amounts) are combined with a water component, and applied against a hardscape, the composition, once cured, defines a retention structure that abuts to, but is not adhered to the hardscape.

Accordingly, the composition as disclosed herein has numerous physical advantages over traditional cement or concrete, such as higher durability, flexibility, and water resistance. Traditional cement or mortar can be prone to cracking or sheering when exposed to inclement weather or ground fluctuations, but the composition as disclosed herein is resistant to such forces. In various embodiments, the composition is independent of all other components (i.e., the composition includes solely cement, sand, gravel, silica fume, and fiber).

Example Hardscape Retention Structure

Figure 3:
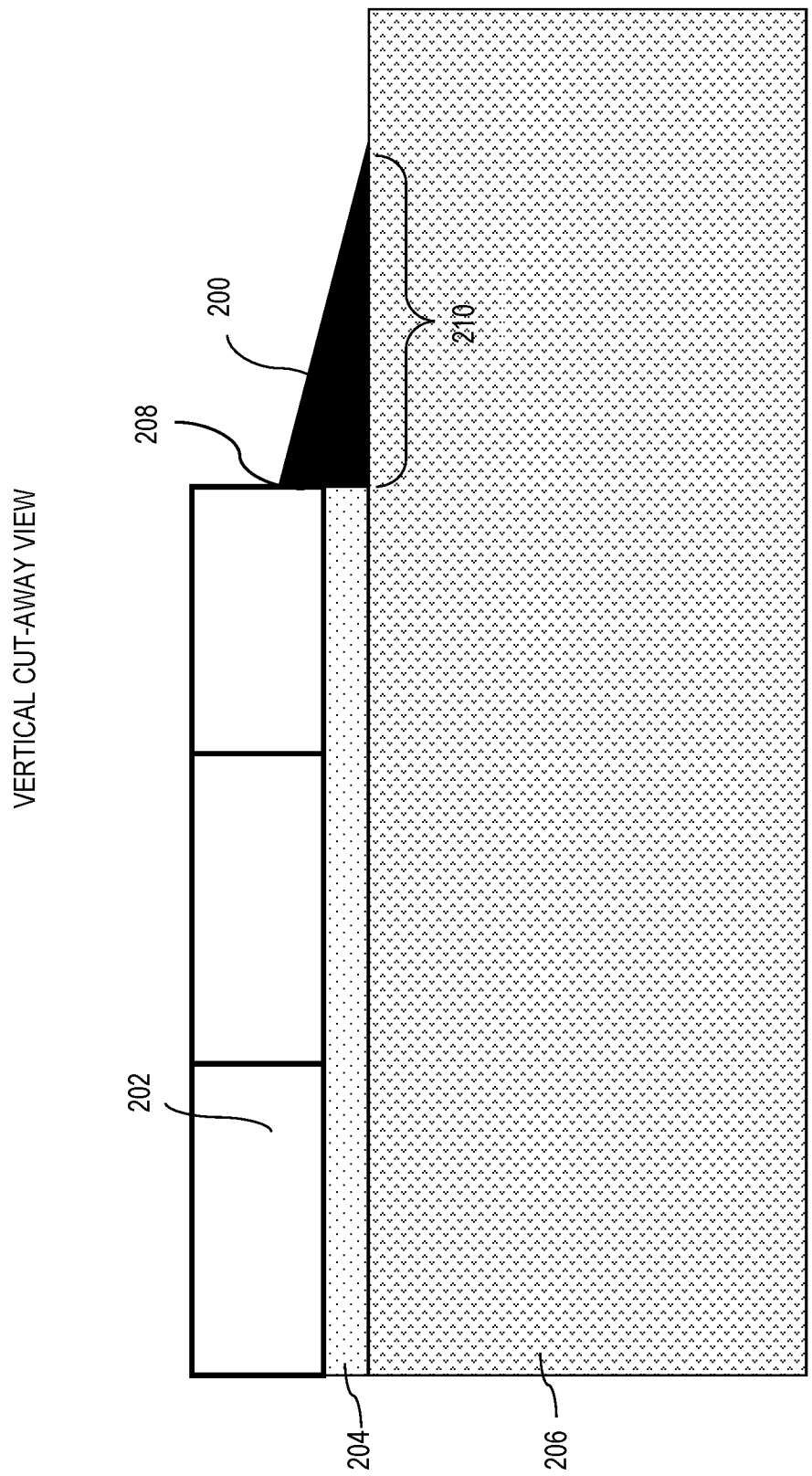
FIG. 3 is a vertical cut-away view of an example embodiment of a retention structure for landscape articles comprised of a composition disclosed herein according to aspects of the present disclosure.

FIG. 3 illustrates a vertical cut-away view of an example embodiment of a retention structure 200 comprised of the composition(s) disclosed herein. In FIG. 3, hardscape 202 (e.g., pavers) are placed on a sub-base 204, both of which rest on a ground surface 206 such as dirt. In many embodiments, the retention structure 200 is comprised of a mixture of a cement component, a sand component, a gravel component, a silica fume component, and a polypropylene fiber component, wherein the retention structure has a height dimension 208 and a width dimension 210.

The retention structure can be created through various processes. In one example, the retention structure 200 is created from the process of mixing a water component with a composition of a cement component, a sand component, a gravel component, a silica fume component, and a fiber component to define a mixture. Thereafter, applying the mixture along an edge of a hardscape, and shaping the mixture along the hardscape. When the cement component, sand component, gravel component, silica fume component, and fiber component are mixed in an effective amount and mixed with the water component, the mixture, once cured, results in a hardscape retention structure that abuts to, but is not adhered to the hardscape.

When installed, in various embodiments the retention structure 200 is against the hardscape 202 (e.g., abuts the hardscape) along the height dimension 208 of the retention structure 200, and tapers away from the hardscape 202 as the retention structure 200 extends along the width dimension 210. The resulting shape of the retention structure 200 is similar to that of a right triangle or a wedge, which are structurally strong and resistant to deformation.

Further, as illustrated in FIG. 3, there is no longer a gap between the retention structure 200 and the hardscape 202 as is the case with other edging solutions mentioned above (see reference numbers 102, 108, and 112 in FIGS. 1-2). Thus, moisture and debris are prevented from getting between the hardscape 202 and the retention structure 200, thus mitigating or eliminating the negative effects caused by freeze/thaw cycles.

In typical concrete applications, concrete tends to grab or bind onto adjacent surfaces and structures, which makes removal of the concrete difficult and time consuming. Conversely, in various embodiments as described herein, the retention structure is flush to, but not adhered to the hardscape, which allows for easier removal of the retention structure 200 if the retention structure 200 is damaged or a new shape/contour is desired.

Figure 4:
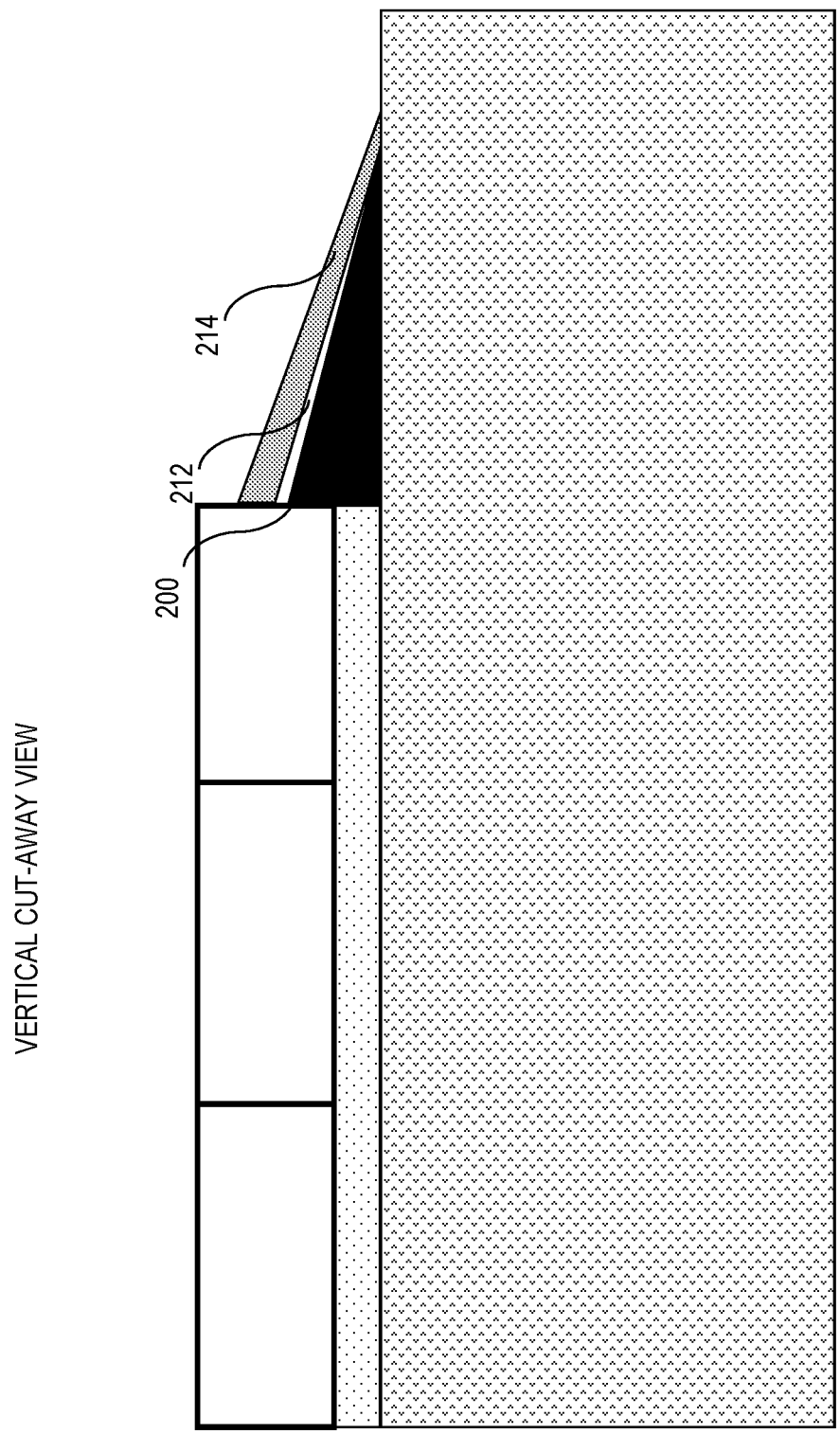
FIG. 4 is a vertical cut-away view of another example embodiment of a retention structure for landscape articles comprised of a composition disclosed herein according to aspects of the present disclosure.

Moreover, as shown in FIG. 4, various implementations of the retention structure 200 comprise a substantially closed pore surface 212 on a top portion on the retention structure 200 that resists water penetration into the retention structure 200. The substantially closed pore surface 212 can be created, for example, by striking a top surface (exposed) of the retention structure 200 after it has been applied, but before the retention structure 200 fully cures. The substantially closed pore surface 212 provides multiple advantages when compared to traditional concrete applications.

For instance, the substantially closed pore surface 212 being water impermeable allows organic material 214 to grow on top of the retention structure 200 if desired, which is typically not the case with traditional concrete as traditional concrete is water permeable. Whereas traditional concrete wicks moisture away from the organic material 214, thus killing the organic material 214, the retention structure 200 repels water, thus allowing organic material 214 to survive.

The substantially closed pore surface 212 also creates a dichotomy where water and moisture does not enter the retention structure 200 through the substantially closed pore surface 212, but allows moisture to absorb into the retention structure 200 from underneath (i.e., water permeable). This absorption helps regulate ground moisture to prevent undesirable effects. In this regard, whereas moisture absorbing into traditional concrete is typically undesirable due to freeze/thaw cycles breaking down the concrete, the retention structure 200 resists the freeze/thaw cycles due in part from air (in the form of air pockets) being introduced into the retention structure 200 via the silica fume. Further, the air introduced by the silica fume also make it easier to strike the surface of the retention structure 200 to form the substantially closed pore surface 212.

The overall dimensions of the retention structure 200 may vary based on need. In some implementations, retention structure's width dimension is two times that of the retention structure's height dimension. For example, the retention structure may be 3 inches (approximately 7.62 centimeters) tall and 6 inches (approximately 15.24 centimeters) wide with a variable length (i.e., long enough to span the pavers 202). In another example, the retention structure may be 2 inches (approximately 5.08 centimeters) tall and 4 inches (approximately 10.16 centimeters) wide.

Figure 5:
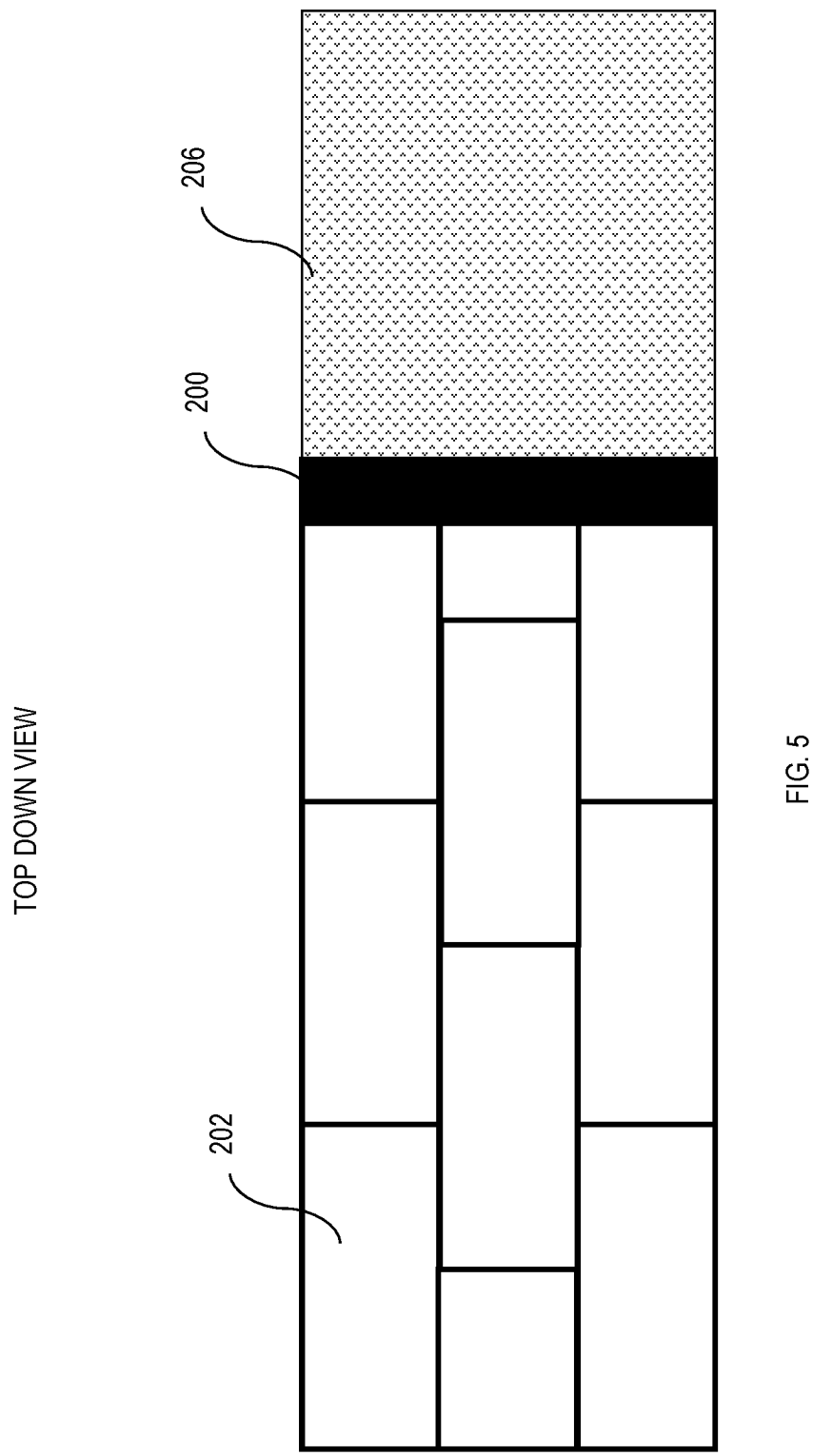
FIG. 5 is a top down view of an example embodiment of a retention structure for landscape articles comprised of a composition disclosed herein according to aspects of the present disclosure.
Figure 6:
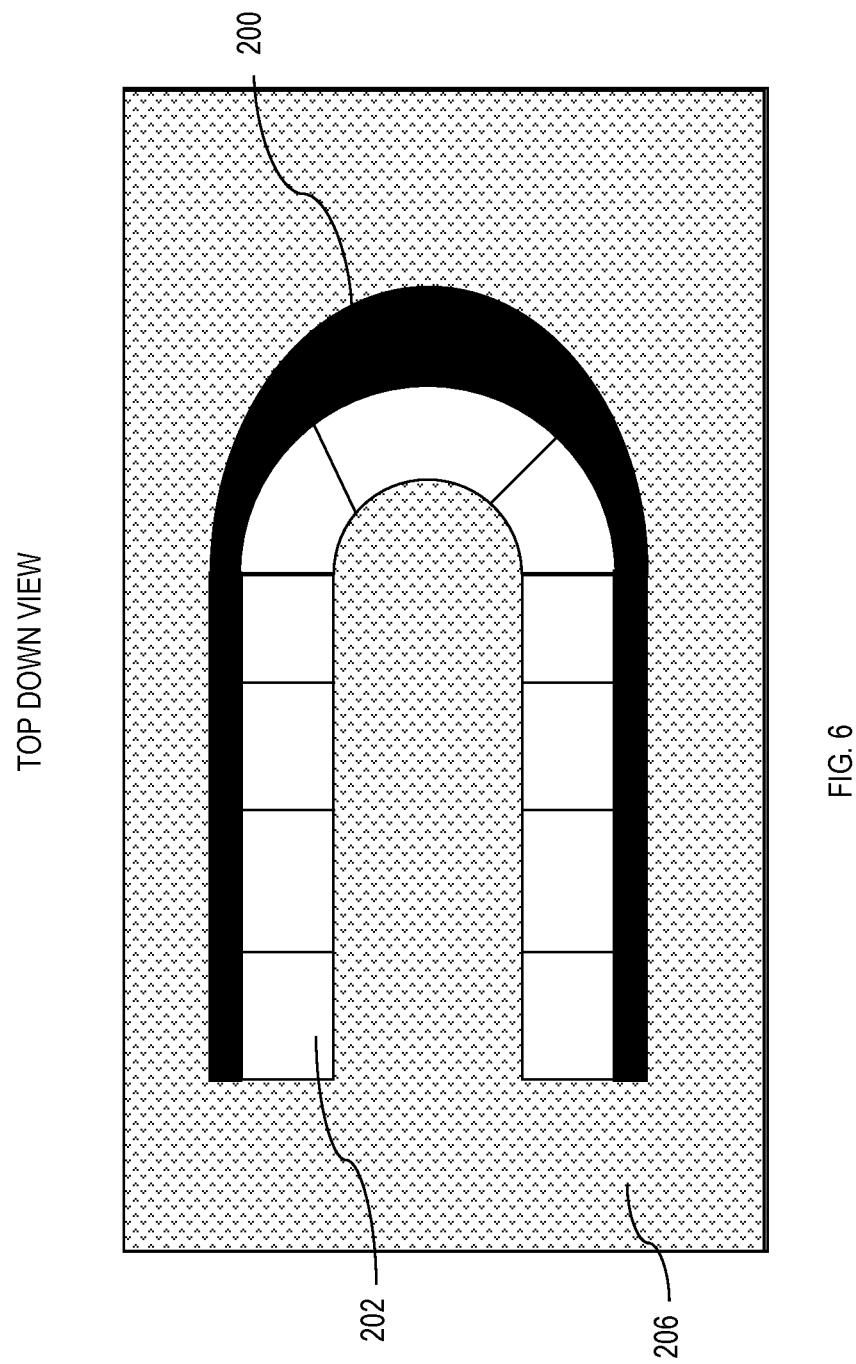
FIG. 6 is a top down view of an alternate example embodiment of a retention structure for landscape articles comprised of a composition disclosed herein according to aspects of the present disclosure.

FIGS. 5-6 are top down views of the retention structure 200 applied along a hardscape 202 (the ground surface 206 shown for context). Contour and shape characteristics of the retention structure 200 can be modified or customized to suit need. In FIG. 5, for example, the shape and contour of the retention structure 200 linear to match the hardscape 202. However, the retention structure 200 can be formed to create more complex shapes and contours as shown in FIG. 6.

In FIG. 6, the retention structure 200 follows a curved contour of the hardscape 202. FIG. 6 also illustrates another advantage of the retention structure 200 over previous solutions (traditional concrete, plastic edges, etc.). Previous solutions may have a segmented or disjointed structure (see. FIG. 2, reference number 108), which may further compromise overall structural integrity.

Conversely, the retention structure 200 can provide a continuous structure along the hardscape 202, which provides higher overall structural integrity along the hardscape 202 and the sub-base, which stays in place during freeze/thaw cycles, thus retaining the sand bed that forms the foundation for the hardscape 202. Unlike other solutions, the retention structure 200 "floats" on the ground surface, thus moving with the ground surface when ground shifts occur, which prevents or at least minimizes cracking or sheering of the retention structure 200. Whereas other edging solutions such as liners and spikes (see. FIG. 1, reference numbers 108 and 110) may degrade from heaves caused by ground shifts, the retention structure 200 is virtually unaffected.

Moreover, since the retention structure 200 can be applied, spread, or smoothed with a trowel, it is easy to tightly couple the created retention structure 200 with the hardscape 202, resulting in no gap between the pavers and edge, even given complex paver geometries. Because there is no gap, a point of failure in conventional paver/liner interfaces is eliminated.

Further, due to the customizable nature of the retention structure 200, a user can thicken or widen the retention structure 200 to adapt to sections of hardscape that apply increased pressure to associated retention structures. For example, in FIG. 6, if the curved section of the hardscape 202 is downhill, then more pressure may be applied to the retention structure 200, thus increasing the chance for structural failure. In response, the user can reinforce the retention structure 200 by making the retention structure 200 taller, wider, etc. as shown in FIG. 6.

Referring briefly to FIG. 7, the customizable nature of the retention structure 200 also allows a user to create a variety of alternative shapes and contours using a trowel, or a specialized tool.

Process for Creating a Continuous Edging for Hardscape

Referring to the figures, and in particular FIG. 8, a process 800 for creating a continuous edging for hardscape is disclosed. The process 800 comprises mixing at 802 water with a composition of a cement component, a sand component, a gravel component, a silica fume component, and a fiber component to define a mixture. In certain implementations, mixing 802 comprises mixing water with a composition consisting of the cement component, the sand component, the gravel component, the silica fume component, and the fiber (i.e., only those components).

Further, the process 800 comprises applying at 804 the mixture along an edge of a hardscape.

Yet further, the process 800 comprises shaping at 806 the mixture along the hardscape, thereby defining a continuous edging. In various implementation, shaping 806 the mixture comprises striking at 808 a top surface of the continuous edging to create a substantially closed pore top layer that resists water penetration into the continuous edging.

In addition, various implementations comprise introduces air into the mixture (e.g., from silica fume) to create pockets within the mixture such that when the continuous edging is defined, the continuous edging is water permeable and resists freeze and thaw cycles.

Benefits of the Present Disclosure

In addition to the numerous benefits of the retention structure(s) and continuous edging(s) disclosed above, another benefit includes longevity. Traditional liners (e.g., plastic liners) can fail in as short as one to three years. When the liner fails, the sub-base (e.g., sand) can escape through the liner failure, which can cause failed edges and paver/hardscape field separation. The composition according to aspects of the present disclosure, conversely, may last up to three to five times the life of a conventional liner, or may provide a permanent solution in some cases, thus dramatically reducing (or eliminating) edge and field repairs.

Further, installation and set/cure time (i.e., compared to traditional concrete) is improved. While tradition concrete may take twenty-four to forty-eight hours to set, the composition as disclosed herein can be installed and set at around four hours. Even plastic liners, depending on the geometry of the hardscape, can take around eight hours or more. One factor that contributes to the reduced set/cure time is a lower water content by volume of the composition. The lower water content by volume allows the composition to set and cure faster than other solutions.

Another advantage of the lower water content by volume is that the composition will have little to no "slump". Generally, slump is a measure of consistency of fresh (i.e., uncured) concrete. If too much slump exists, then shaping the composition is difficult because the composition will tend to slide or deform. Conversely, the composition having little to no slump allows a user to sharply define desired shapes and contours.

Miscellaneous

In any of the compositions herein, the gravel can be any suitable gravel, and in one example embodiment has a size that ranges from about 0.45 centimeters to about 0.55 centimeters (although other sizes and size ranges can be utilized). In any of the compositions herein, the silica fume can comprise a densified dry powder micro silica admixture. Moreover, in any of the compositions herein, the fiber can comprise a monofilament fiber having a typical fiber length of about 0.5 inches (approximately 1.27 centimeters), although other lengths or combinations of length can be utilized.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A composition for use with hardscaping, the composition consisting essentially of:
   a cement component having a weight between about 10% and about 25% by weight of the composition;
   a sand component having a weight between about 30% and about 50% by weight of the composition;
      a silica fume component having a weight between about 0.20% and about 1.40% by weight of the composition;
   a gravel component having a weight between about 35% and about 55% by weight of the composition; and
   a fiber component having a weight between about 0.005% and about 0.025% by weight of the composition;
   wherein the cement component, sand component, silica fume component, gravel component, and fiber component are mixed in an effective amount, such that when the composition is combined with a water component, and is applied against a hardscape, the composition, once cured, defines a retention structure that abuts to, but is not adhered to the hardscape.

2. The composition of claim 1, wherein:
   the water component is between about 8% and about 12% of a total weight of the composition, and the composition, when mixed with the water component, forms a substantially closed pore surface on a top portion on the retention structure that resists water penetration into the hardscape retention structure.

3. The composition of claim 1, wherein:
   the cement component has a weight between about 14% and about 19% by weight of the composition;
   the sand component has a weight between about 35% and about 45% by weight of the composition;
   the gravel component has a weight between about 40% and about 50% by weight of the composition,
   the silica fume component has a weight between about 0.40% and about 1.20% by weight of the composition; and
   the fiber component has a weight between about 0.0100% and about 0.0200% by weight of the composition.

4. The composition of claim 1, wherein:
   the cement component has a weight between about 16% and about 17% by weight of the composition;
   the sand component has a weight between about 38% and about 41% by weight of the composition;
   the gravel component has a weight between about 42% and about 46% by weight of the composition;
   the silica fume component has a weight between about 0.60% and about 1.00% by weight of the composition; and
   the fiber component has a weight between about 0.0125% and about 0.0175% by weight of the composition.

5. The composition of claim 1, wherein the fiber component is comprised of fibers that are heterogeneous in length.

6. The composition of claim 1, wherein:
   the hardscape comprises at least one of paver, stone, concrete, and interlocking hardscape systems; and
   the retention structure is formed by a mixture of water with the cement component, the sand component, the gravel component, the silica fume component, and the fiber component in an effective amount so as to abut a height dimension of the retention structure and taper away therefrom so as to define a wedge shape.

7. The composition of claim 1, wherein the sand component is silica sand.

8. A composition for paver retention, the composition comprising:
   a cement component having a weight between about 10% and about 25% by weight of the composition;
   a sand component that is silica sand, the silica sand component having a weight between about 30% and about 50% by weight of the composition;
   a gravel component having a weight between about 35% and about 55% by weight of the composition;
   a silica fume component having a weight between about 0.20% and about 1.40% by weight of the composition; and
   a fiber component that includes fibers that are heterogeneous in length, the fiber component having a weight between about 0.005% and about 0.025% by weight of the composition and comprising at least one of a thermoplastic polymer, a polypropylene, a polyethylene, a polyester, a nylon, an acrylic, a macro-fiber, a micro-fiber, a sika fiber, and a fiber blend;
   wherein when the cement component, sand component, gravel component, silica fume component, and fiber component are mixed in an effective amount, such that when the composition is combined with a water component, and is applied against a hardscape, the composition, once cured, defines a retention structure that abuts to, but is not adhered to the hardscape; and
   the silica fume introduces air pockets into the retention structure once cured, such that the air pockets resist damage to the retention structure due to freeze and thaw cycles.

9. The composition of claim 8, wherein the composition is independent of all other components.

10. The composition of claim 8, wherein:
   the water component is between about 8% and about 12% of a total weight of the composition, and the composition, when mixed with the water component, forms a substantially closed pore surface on a top portion on the retention structure that resists water penetration into the hardscape retention structure.

11. The composition of claim 8, wherein:
   the cement component has a weight between about 14% and about 19% by weight of the composition;
   the sand component has a weight between about 35% and about 45% by weight of the composition;
   the gravel component has a weight between about 40% and about 50% by weight of the composition;
   the silica fume component has a weight between about 0.40% and about 1.20% by weight of the composition; and the fiber component has a weight between about 0.0100% and about 0.0200% by weight of the composition.

12. The composition of claim 8, wherein:
the cement component has a weight between about 16% and about 17% by weight of the composition;
the sand component has a weight between about 38% and about 41% by weight of the composition;
the gravel component has a weight between about 42% and about 46% by weight of the composition;
the silica fume component has a weight between about 0.60% and about 1.00% by weight of the composition; and
the fiber component has a weight between about 0.0125% and about 0.0175% by weight of the composition.

13. The composition of claim 8, wherein:
the hardscape comprises at least one of paver, stone, concrete, and interlocking hardscape systems; and
the retention structure is formed by a mixture of water with the cement component, the sand component, the gravel component, the silica fume component, and the fiber component in an effective amount so as to abut a height dimension of the retention structure and taper away therefrom so as to define a wedge shape.

14. The composition of claim 8, wherein air pockets are formed within the mixture such that when the retention structure is water permeable.

15. The composition of claim 1, wherein:
when the composition is combined with the water component, is applied against the hardscape, and a top surface of the retention structure is stricken, the retention structure forms a closed pore surface that resists water penetration.

16. The composition of claim 1, wherein:
the silica fume introduces air pockets into the retention structure once cured, such that the air pockets resist damage to the retention structure due to freeze and thaw cycles.

17. The composition of claim 1, wherein:
the retention structure is shaped such that a width of the retention structure is at least two times a height of the retention structure.

* * * * *